(12) United States Patent
Park et al.

(10) Patent No.: US 10,787,165 B2
(45) Date of Patent: Sep. 29, 2020

(54) HYBRID VEHICLE AND METHOD OF CHANGING OPERATION MODE FOR THE SAME

(71) Applicants: HYUNDAI MOTOR COMPANY, Seoul (KR); KIA MOTORS CORPORATION, Seoul (KR)

(72) Inventors: Joon Young Park, Seoul (KR); Jung Min Cha, Incheon (KR); Jea Mun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 391 days.

(21) Appl. No.: 15/851,653

(22) Filed: Dec. 21, 2017

(65) Prior Publication Data

US 2019/0126907 A1 May 2, 2019

(30) Foreign Application Priority Data

Nov. 1, 2017 (KR) .................. 10-2017-0144682

(51) Int. Cl.
*B60W 20/16* (2016.01)
*B60L 58/13* (2019.01)
(Continued)

(52) U.S. Cl.
CPC ............ *B60W 20/16* (2016.01); *B60L 58/13* (2019.02); *B60W 10/06* (2013.01); *B60W 10/08* (2013.01); *B60W 10/26* (2013.01); *B60W 20/12* (2016.01); *B60W 20/13* (2016.01); *B60W 30/182* (2013.01); *B60W 50/0097* (2013.01); *B60L 2240/44* (2013.01); *B60L 2240/54* (2013.01); *B60L 2260/26* (2013.01);
(Continued)

(58) Field of Classification Search
CPC ...... B60W 20/16; B60W 20/12; B60W 20/13; B60L 58/13
USPC .......................................... 701/22
See application file for complete search history.

(56) References Cited

U.S. PATENT DOCUMENTS 6,687,607 B2  2/2004 Graf et al.
9,764,632 B2  9/2017 Yu et al.
(Continued)

FOREIGN PATENT DOCUMENTS

FR         3037025 A1    12/2016
KR      10-1307405 B1     9/2013
(Continued)

OTHER PUBLICATIONS

Extended European Search Report of corresponding Patent Application No. 17210734.4—9 pages (dated May 25, 2018).

*Primary Examiner* — Tan Q Nguyen
(74) *Attorney, Agent, or Firm* — Brinks Gilson & Lione

(57) ABSTRACT

A method for controlling a hybrid vehicle is disclosed. The method comprises calculating, for a low-emission area on the vehicle's current travel, a first energy to travel the low-emission area in a first driving mode, determining whether the hybrid vehicle is capable of traveling the low-emission area in the first driving mode using current energy of a vehicle battery, and when it is determined that the hybrid vehicle is incapable of traveling the low-emission area in the first driving mode using current energy of the vehicle batter, initiating a battery charging operation before the vehicle enters the emission-restricted area.

15 Claims, 7 Drawing Sheets

(51) Int. Cl.
  *B60W 20/13* (2016.01)
  *B60W 30/182* (2020.01)
  *B60W 20/12* (2016.01)
  *B60W 10/08* (2006.01)
  *B60W 50/00* (2006.01)
  *B60W 10/06* (2006.01)
  *B60W 10/26* (2006.01)
(52) U.S. Cl.
  CPC .. *B60L 2270/12* (2013.01); *B60W 2050/0089* (2013.01); *B60W 2510/244* (2013.01); *B60W 2520/10* (2013.01); *B60W 2552/05* (2020.02); *B60W 2552/15* (2020.02); *B60W 2554/00* (2020.02); *B60W 2555/60* (2020.02); *B60W 2555/80* (2020.02); *B60W 2556/50* (2020.02); *B60W 2710/06* (2013.01); *B60W 2710/244* (2013.01); *Y10S 903/93* (2013.01)

(56) References Cited

U.S. PATENT DOCUMENTS

| | | | |
|---|---|---|---|
| 10,071,647 B2 * | 9/2018 | Dalum | B60W 20/00 |
| 2003/0078707 A1 | 4/2003 | Shioda et al. | |
| 2014/0163789 A1 * | 6/2014 | Yu | B60W 20/13 |
| | | | 701/22 |
| 2015/0291145 A1 | 10/2015 | Yu | |
| 2016/0023649 A1 * | 1/2016 | Muller | B60W 10/08 |
| | | | 701/22 |
| 2017/0015208 A1 | 1/2017 | Dunlap et al. | |
| 2017/0066429 A1 | 3/2017 | Ogawa | |

FOREIGN PATENT DOCUMENTS

| | | |
|---|---|---|
| KR | 10-2016-0071989 A | 6/2016 |
| KR | 10-1738818 B1 | 5/2017 |

* cited by examiner

HYBRID VEHICLE AND METHOD OF CHANGING OPERATION MODE FOR THE SAME

CROSS-REFERENCE TO RELATED APPLICATION

This application claims priority to and the benefit of Korean Patent Application No. 10-2017-0144682, filed on Nov. 1, 2017, which is incorporated herein by reference in its entirety.

FIELD

The present disclosure relates to a hybrid vehicle and a driving mode control method therefor, and more particularly, to a hybrid vehicle and control method capable of performing a driving mode transition related to a variation in a state of charge of a battery using route information to a destination.

BACKGROUND

The disclosure in this section merely provide background information related to the present disclosure and may not constitute prior art.

A hybrid electric vehicle (HEV) generally refers to a vehicle that uses two power sources together. The two power sources are mainly an engine and an electric motor. HEVs are recently under vigorous development since HEVs are superior to vehicles provided with an internal combustion engine in terms of fuel efficiency, power performance, and exhaust gas reduction.

The HEV is capable of operating in two modes depending on which powertrain is driven. One of the modes is an electric vehicle (EV) mode in which the HEV runs using only the electric motor, and the other mode is a hybrid electric vehicle (HEV) mode in which the electric motor and the engine are operated together to obtain power. The HEV switches between the two modes according to operation conditions.

In particular, in the case of a plug-in hybrid vehicle (PHEV), in addition to classification of the operation modes according to the powertrain described above, the operation modes may also be divided into a charge depleting (CD) mode and a charge sustaining (CS) mode based on change in the state of charge (SOC) of the battery. Generally, in the CD mode, the electric motor is driven by the electric power of the battery without the power of the engine to operate the vehicle. In the CS mode, the power of the engine is used, and wherein the battery SOC is not lowered.

The disclosure of this section is to provide background of the invention. Applicant notes that this section may contain information available before this application. However, by providing this section, Applicant does not admit that any information contained in this section constitutes prior art.

SUMMARY

Various aspects of the present invention are directed to providing a hybrid vehicle and a method of performing a mode transition for the same that substantially obviate one or more problems due to limitations and disadvantages of the related art.

Various aspects of the present invention are directed to providing a method of more efficiently controlling mode switch in a hybrid vehicle and a vehicle for performing the same.

Various aspects of the present invention intend to provide a method capable of minimizing engine start in a specific area.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling mode transition for a hybrid vehicle comprises calculating, when at least one specific area associated with exhaust emission is detected on a travel route, a first energy required to travel the at least one specific area in a first driving mode, determining whether the hybrid vehicle is capable of traveling at least one specific area in the first driving mode according to a charge state of a battery based on the calculated first energy, traveling the travel route in the first driving mode or a second driving mode in consideration of the first energy, when it is determined that the hybrid vehicle is capable of traveling in the first driving mode, and setting at least one charging section when it is determined that the hybrid vehicle is incapable of traveling in the first driving mode.

Also, a hybrid vehicle according to one form of the present disclosure comprises a first controller configured to, when at least one specific area related to exhaust emission is detected on the travel route, obtain information on the travel route including the at least one specific area, and a second controller configured to calculate a first energy required to travel the at least one specific area in a first driving mode based on the information obtained from the first controller, determine whether the hybrid vehicle is capable of traveling at least one specific area in the first driving mode according to a charge state variation of a battery based on the calculated first energy, control driving in the first driving mode or driving in a second driving mode to be performed for the travel route in consideration of the first energy, when it is determined that the hybrid vehicle is capable of traveling in the first driving mode, and set at least one charging section when it is determined that the hybrid vehicle is incapable of traveling in the first driving mode.

It is to be understood that both the foregoing general description and the following detailed description of the present disclosure are exemplary and explanatory and are intended to provide further explanation of the present disclosure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
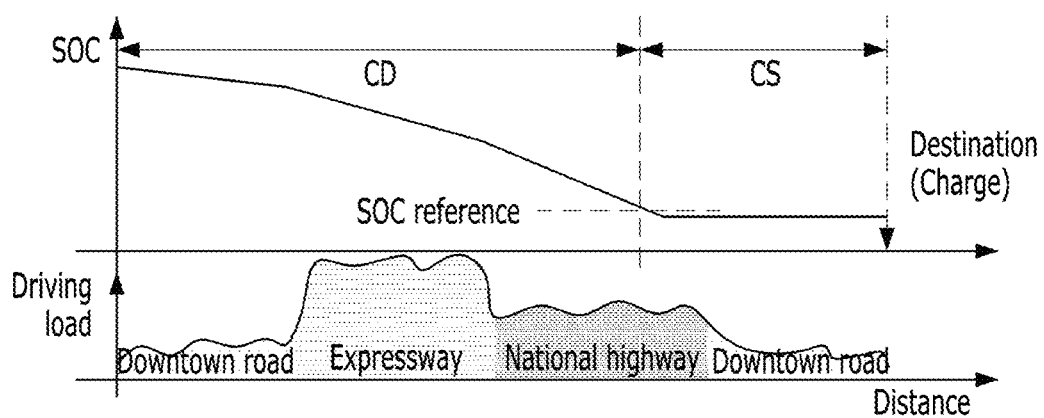
FIG. 1 illustrates an example of mode switch performed in a typical PHEV.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure may, however, be embodied in many different forms and should not be construed as limited to the forms set forth herein. In order to clearly illustrate the present disclosure in the drawings, parts not related to the description are omitted.

Throughout the present disclosure, when a part is referred to as "including" an element, it means that the part may include other elements as well, unless specifically stated otherwise. In addition, parts denoted by the same reference numerals throughout the present disclosure denote the same components.

Also, the terms, such as 'unit' or 'module', etc., should be understood as a unit that processes at least one function or operation and that may be embodied in a hardware manner (e.g., a processor), a software manner, or a combination of the hardware manner and the software manner.

An aspect of the present invention provides a method for controlling a hybrid electric vehicle to prevent or limit operation of a combustion engine when driving a low-emission zone where operating combustion engine is prohibited or limited.

While driving or prior to starting, at least one computing device (controller) of the hybrid vehicle identifies the vehicle's (current) driving route to a destination. The vehicle's driving route (solid line in FIG. 4) passes through a low-emission zone 430 (where exhaust gas from a combustion engine is regulated). The controller 240 identifies a first section of the vehicle's driving route that passes the low-emission zone. In embodiments, the first section is a section of the driving route that overlaps with the low-emission zone 430 on a map shown in FIG. 4. The vehicle enters to the low-emission zone 430 at the starting point of the first section and exits the low-emission zone 430 at the end of the first section.

Figure 9:
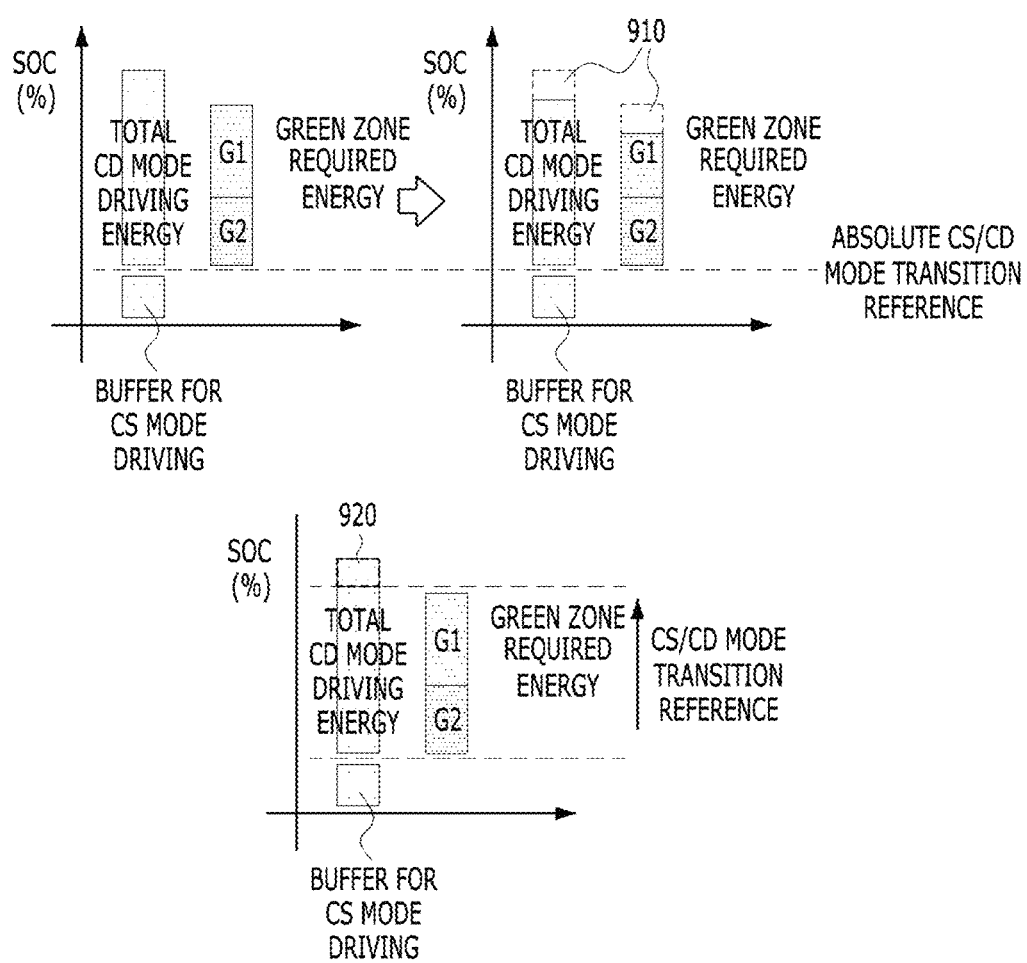
FIG. 9 shows an example of setting a mode switching reference is performed based on spare energy according to one form of the present disclosure.

When distance (or time) to the low-emission zone is less than a predetermined reference (1, 5, 10, 20 or 30 minutes, or 0.5, 1, 2, 5 mile), the controller estimates a first State of Charge (SOC) of the vehicle's battery (supplying power to motor 140) enough to drive through the first section of low-emission zone without operating the vehicle's combustion engine. In embodiments, the controller estimates battery energy to drive from the start to the end of the first section without using power from the engine 110 (EV mode driving). In embodiments, the controller determines the first SOC considering a margin 910, and a buffer for CS mode driving (FIG. 9).

Subsequently, the controller determines whether the current SOC is enough to drive through the first section (low-emission zone on the current route) without using power from the engine 110. In embodiments, the controller further considers estimated battery discharge/charge from the current position to the starting point of low-emission zone and determines whether the current SOC is sufficient to drive through the low-emission zone (the first section) in a EV driving mode.

When it is determined that the current SOC is sufficient to drive through low-emission zone (greater than the first SOC), the controller prevents SOC of the battery from falling below the first SOC by increasing a reference SOC to operate the engine 110 for battery charging (FIG. 9, updating CS/CD transition reference updating) from the vehicle's current position until the vehicle reaches the low-emission zone. On entering the low-emission zone, the vehicle drives in a EV driving mode without operating the engine.

When it is determined that the current SOC is not sufficient to drive through low-emission zone (lower than the first SOC), the controller operates the engine 110 for battery charging before the vehicle reaches the low-emission zone (the starting point of the first section). In embodiments, the controller determines when to start the battery charging at least based on charging rate of the battery and the current SOC such that the vehicle enters the low-emission zone (at the starting point of the first section) with a SOC higher than the first SOC and such that the vehicle does not operate it engine while passing through the low-emission zone In the case of a typical PHEV, the vehicle travels in the CD mode regardless of the operation conditions such as the driving load, the possibility of charging, and the distance to the destination, and then switches to the CS mode according to exhaustion of the SOC. The present case will be described with respect to FIG. 1.

FIG. 1 illustrates an example of mode switch performed in a typical PHEV.

In FIG. 1, the horizontal axis represents distance, the vertical axis of the upper graph represents the state of charge (SOC) of the battery of the PHEV, and the vertical axis of the lower graph represents driving load.

First, the lower graph of FIG. 1 depicts a route having cities, a national highway, and an expressway between the place of departure and the destination. The driving load on the route is the highest on the highway, and is higher on national highways than in cities. In running on the present route, the typical PHEV departs a place in the CD mode without considering variation in driving load, and switches to the CS mode when the SOC falls below a preset reference.

The CD mode exhibits relatively favorable efficiency in low-speed/low-load driving, and the CS mode exhibits relatively favorable efficiency in high-speed/high-load driving. Therefore, when the mode switching is performed based only on the SOC value as described above, the efficiency may be greatly lowered depending on the route because the driving load is not considered. Energy efficiency characteristics of such a hybrid power train will be described with reference to FIG. 2

Figure 2:
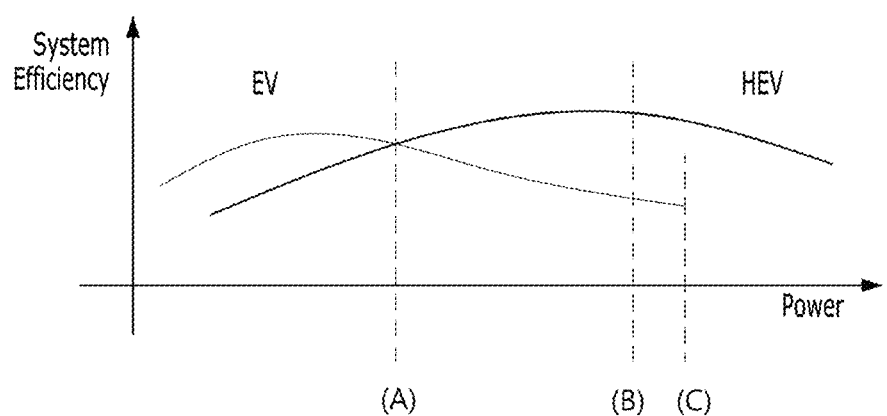
FIG. 2 is a diagram for explaining power train energy efficiency characteristics of a general hybrid vehicle.

FIG. 2 is a diagram for explaining power train energy efficiency characteristics of a general hybrid vehicle.

In FIG. 2, the horizontal axis represents the output (POWER) of the power train, and the vertical axis represents the system efficiency of the power train.

Referring to FIG. 2, the EV mode driving using the electric motor is effective in the low output section, but the HEV mode driving is more effective after the point (A) where the efficiency of the EV mode intersects with the efficiency of the HEV mode. Also, the electric motor generally reaches the maximum output point (C) first than the engine.

Accordingly, the point (A) may be the reference for starting the engine in the CS mode, and the point (B) at which the efficiency of the HEV mode becomes the maximum may be the reference for starting the engine in the CD mode.

To address the present issue, an adaptive mode switching (adaptive CD/CS) method may be considered. The adaptive mode switching method involves automatically switching between the CD/CS modes according to the optimum efficiency using the Distance Until Charge (DUC), which is the travel distance until a next charge, the Drive To Empty (DTE), which is a travelable distance in the EV mode, an operation condition, navigation information, and the like when the vehicle travels longer than the All Electric Range (AER), which is the distance which the vehicle can travel using only the electric motor.

For example, when the adaptive mode switching method is applied, the vehicle may travel in the CS mode if the current driving load is greater than a predetermined value based on the operation condition, and travel in the CD mode if the driving load is low. Of course, if DUC≤DTE in a section where the driving load is higher than a predetermined value, the vehicle may be caused to exhaust the SOC in the DUC by operating in the CD mode. The present adaptive mode switching method will be described with respect to FIG. 3.

Figure 3:
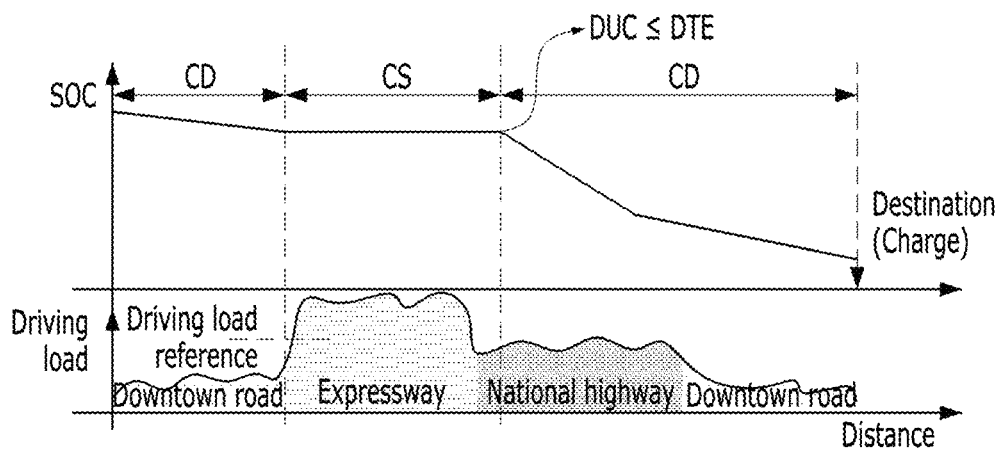
FIG. 3 illustrates an example of mode switch performed in a typical PHEV when an adaptive mode switching method is applied.

FIG. 3 illustrates an example of mode switch performed in a typical PHEV when an adaptive mode switching method is applied.

In FIG. 3, the meanings of the horizontal and vertical axes and the route configuration are assumed to be the same as in FIG. 1.

Referring to FIG. 3, the vehicle operates in the CD mode at startup. However, when the vehicle enters a section (the expressway in the figure) in which the driving load exceeds a preset driving load, the vehicle mode is switched to the CS mode even if the SOC is greater than or equal to a predetermined value. In a section in which DUC≤DTE, the vehicle may switch back to the CD mode, enabling efficient driving.

However, the above-mentioned control schemes merely focus on efficiency in the operation of environment-friendly vehicles which is far from the ultimate goal for the environment-friendly vehicles. For example, there is a need for a method capable of minimizing engine operation in an area where reduction of exhaust gas is recommended for reasons such as regulation, environment, safety, and pedestrian density, while satisfying efficiency.

Before explaining the mode transition method according to the forms of the present disclosure, the concept of the area affected by the exhaust emissions will be described first.

Figure 4:
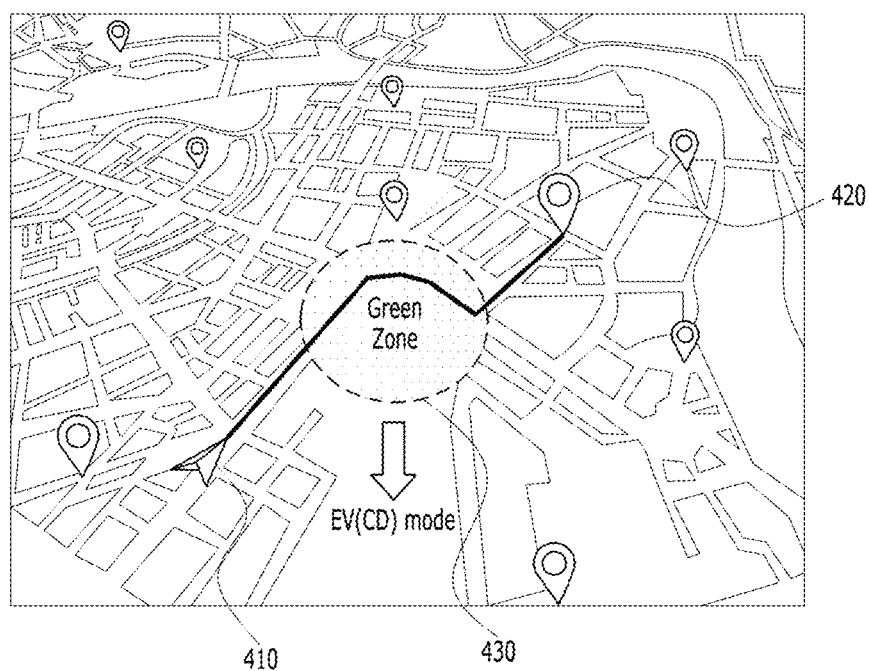
FIG. 4 is a view for explaining a concept of a specific area to which embodiments of the present disclosure can be applied.

FIG. 4 is a view for explaining a concept of a specific area to which embodiments of the present disclosure can be applied.

Referring to FIG. 4, it is assumed that, in the embodiments of the present disclosure, there is a specific area 430 between the departure point 410 and the destination 420 where exhaust emission reduction or emission prohibition is required. Such an area 430 may be a predetermined area or may be variably set according to current/recent circumstances.

Here, the predetermined area may include an area set by a regulatory or governmental policies (for example, off-gas management area, such as London and Seoul) and the region where reduced exhaust emissions by the local characteristics (e.g., Children protection Area, indoor parking, residential area, park, drive-through, hospital, etc.).

Further, the area variably set may include an area that can be checked over the wireless information such as the Telematics service, and a pedestrian-crowded area determined through a vision information acquiring device (ADAS system or the like) provided in the vehicle, and the like. For example, an area where the atmospheric condition deteriorates is detected via the atmospheric environment information, an area where is crowded with pedestrians is detected based on the Big Data using the location information of the smartphone, and an area where a large amount of exhaust emissions is expected based on traffic information may correspond to the area variably set.

In addition, the area 430 affected by the exhaust emissions may be set as a unit of an arbitrary administrative zone, a zone defined by connecting a plurality of coordinates as a boundary point, a zone corresponding to a specific facility itself or a part thereof, or a zone within a certain radius distance from a coordinate or a specific facility.

The above-described examples for setting the specific area are illustrative, and the present disclosure is not limited by the setting criteria, the setting range, the setting period, and the like of the specific area of the present invention. Also, it is assumed that the specific area 430 is located between the departure point 410 and the destination 420 but the destination 420 does not have to be set by a user's explicit command for the navigation function of the AVN (Audio/Video/Navigation). For example, the destination 420 may be arbitrarily set in the vehicle according to a driving pattern of the driver or a predetermined driving condition (time, area, etc.). However, it is preferable that the existence and the size of the specific area 430 in the route are acquired in the vehicle at least before entering the area for driving mode distribution.

In the following description, the area affected by exhaust emissions is referred to as "Green Zone", for convenience.

Next, with reference to FIGS. 5 and 6, the structure of the hybrid vehicle and the control system in accordance with one form of the present disclosure will be described.

Figure 5:
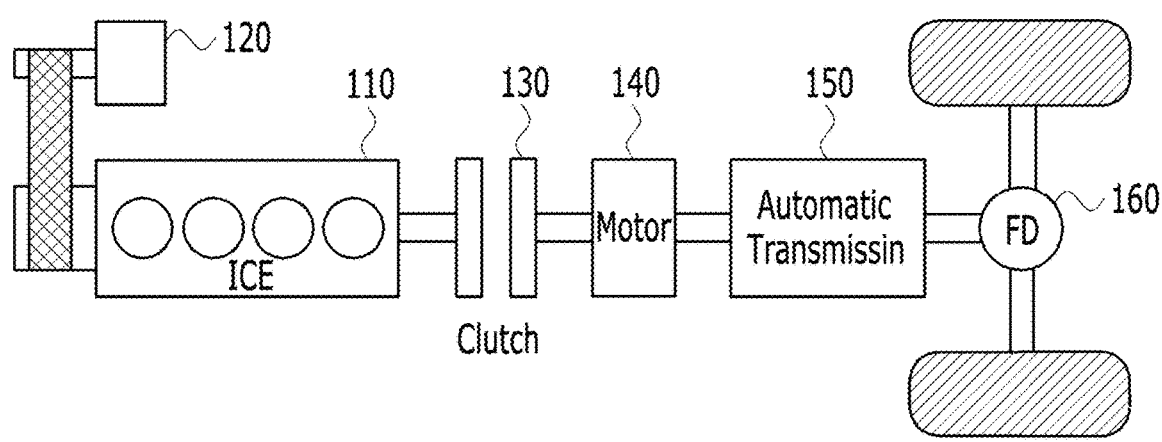
FIG. 5 is a schematic view exemplarily illustrating the structure of a powertrain of a hybrid electric vehicle in accordance with one embodiment of the present disclosure.

FIG. 5 is a schematic view exemplarily illustrating the structure of a powertrain of a hybrid electric vehicle in accordance with one embodiment of the present disclosure.

FIG. 5 illustrates a powertrain of a hybrid electric vehicle employing a parallel-type hybrid system in which an electric motor (or a driving motor) 140 and an engine clutch 130 are disposed between an internal combustion engine (ICE) 110 and an automatic transmission 150.

In general, in such a hybrid electric vehicle, if a driver presses an accelerator pedal after starting of the hybrid electric vehicle, the engine motor 140 is primarily driven using power of a main battery in the open state of the engine clutch 130, and wheels are moved by power of the electric motor 140 via the transmission 150 and a final drive 160 (FD) (i.e., in the EV mode). When the hybrid electric vehicle is gradually accelerated, gradual increase in driving force is required and thus a starter generator motor 120 is operated to drive the engine 110.

Thereby, when rotating speeds of the engine 110 and the electric motor 140 become equal, the engine clutch 130 is closed and thus the hybrid electric vehicle is driven by both the engine 110 and the electric motor 140 (i.e., transition from the EV mode to the HEV mode). When predetermined engine stall conditions, such as deceleration of the hybrid electric vehicle, are satisfied, the engine clutch 130 is opened and the engine 110 is stopped (i.e., transition from the HEV mode to the EV mode). Here, the electric motor 140 charges the main battery using the driving force of the wheels and such a process is referred to as braking energy regeneration or regenerative braking. Additionally, the starter generator motor 120 serves as a starter motor when the engine is started, and serves as a generator during recovery of rotational energy of the engine 110 after the engine 110 is started or when the engine 110 is turned off, thus being referred to as a hybrid starter generator (HSG).

Figure 6:
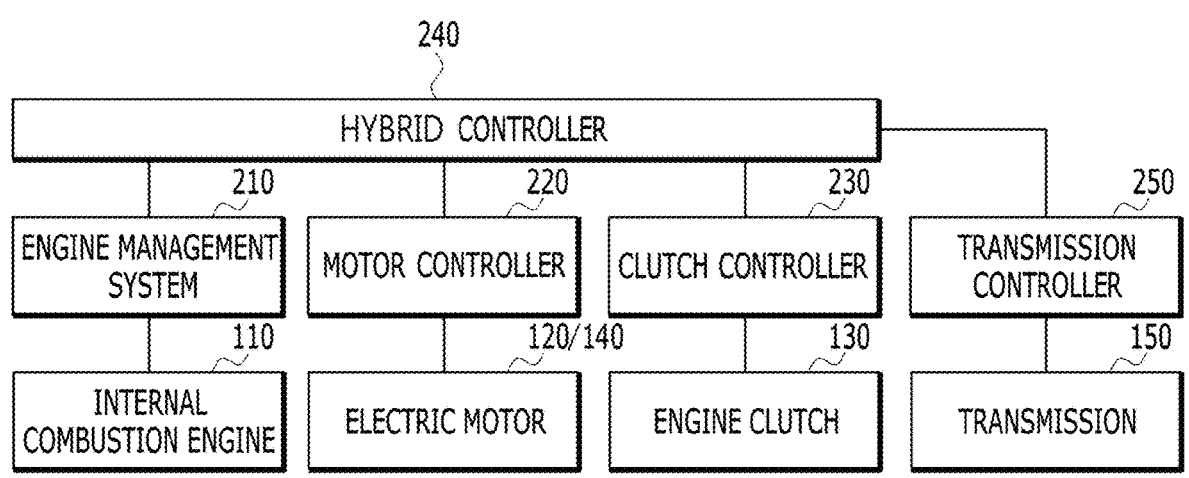
FIG. 6 is a block diagram exemplarily illustrating a control system of the hybrid electric vehicle in accordance with one embodiment of the present disclosure.

Relations between controllers or control units in a hybrid electric vehicle, to which the above-described powertrain is applied, will be shown in FIG. 6.

FIG. 6 is a block diagram exemplarily illustrating a control system of the hybrid electric vehicle in accordance with one embodiment of the present disclosure.

With reference to FIG. 6, in the hybrid electric vehicle in accordance with one embodiment of the present disclosure, an engine controller 210 may control the operation of the internal combustion engine 110, a motor controller (MCU) 220 may control the operation of the starter generator motor 120 and the electric motor 140, and a clutch controller 230 may control the operation of the engine clutch 130. Here, the engine controller 210 may be referred to as an engine management system (EMS). Further, a transmission controller 250 may control operation of the transmission 150. According to some embodiments, the starter generator motor 120 and the electric motor 140 may be separately controlled by different motor controllers.

The above-described respective controllers 210, 220, 230 and 250 may be connected to an upper-level controller, i.e., a hybrid controller 240 which executes overall control of the powertrain in the hybrid electric vehicle (hereinafter, referred to as a "hybrid controller" or "hybrid control unit (HCU)"). The respective controllers 210, 220, 230 and 250 may provide to the hybrid controller 240 with information necessary for driving mode switching, information necessary for control of the engine clutch 130 during gear shifting, and/or information necessary for control of stoppage of the engine 110. The respective controllers 210, 220, 230 and 250 may additionally or alternatively execute operation according to a control signal under the control of the hybrid controller 240.

In more detail, the hybrid controller 240 determines whether or not mode switching is executed according to the driving state of the hybrid electric vehicle. For example, the hybrid controller 240 determines an opening time of the engine clutch 130, and controls a hydraulic pressure (in the case of a wet EC) or controls torque capacity (in the case of a dry EC) when the engine clutch 130 is opened. Further, the hybrid controller 240 may determine the state (e.g., the lock-up, the slip state, the open state, or the lock-up stuck state) of the engine clutch 130 through the clutch controller 230, control the cut-off time of fuel injection of the engine 110, and control the sub-controllers (or lower level controllers, e.g., 210, 220, 230 and 250) for determining and performing the mode transition condition at the time of the mode transition control according to the embodiments of the present disclosure to be described later.

Of course, it is apparent to those skilled in the art that the connection relations between the above-described controllers and the functions/divisions of the respective controllers are exemplary and the names of the respective controllers are not limited thereto. For example, any one of the controllers other than the hybrid controller 240 may provide the functions of the hybrid controller 240, or two or more of the other controllers may divisionally provide the functions of the hybrid controller 240 in the distributed manner.

Hereinafter, an efficient mode transition control method according to one form of the present disclosure will be described based on the above-explained vehicle structures.

According to one form of the present disclosure, it is proposed to use the traveling route information to perform a mode switching so that the CD mode driving can be performed in the green zone when there is a green zone (a low-emission zone) on the route.

According to one aspect of the present form, the traveling route information may be navigation information. Here, the navigation information may include at least one of green zone information, a type of road, an inclination, an average vehicle speed, and a congestion degree (real time traffic information). Generally, the navigation information can be obtained from the AVN System, but is not limited thereto. For example, the navigation information may be obtained from a telematics center via a telematics modem, or may be obtained through a data center/server/cloud connection using a wireless communication module, and vehicle speed information may be acquired through various sensors in the vehicle.

Also, in order to maximize the CD mode driving in the green zone, it is proposed to compare the energy required for passing through the green zone in the CD mode driving (hereinafter, referred to as "green zone required energy") with the energy that can be used for CD mode driving among the energy currently stored in the battery (hereinafter, referred to as "total CD mode driving energy" for convenience). Depending on the comparison result, a criterion for transition to the CD mode driving may be set or additional battery charging may be performed in the CS mode driving.

Hereinafter, the mode transition control method according to the present embodiment will be described in detail with reference to FIGS. 7 to 12.

Figure 7:
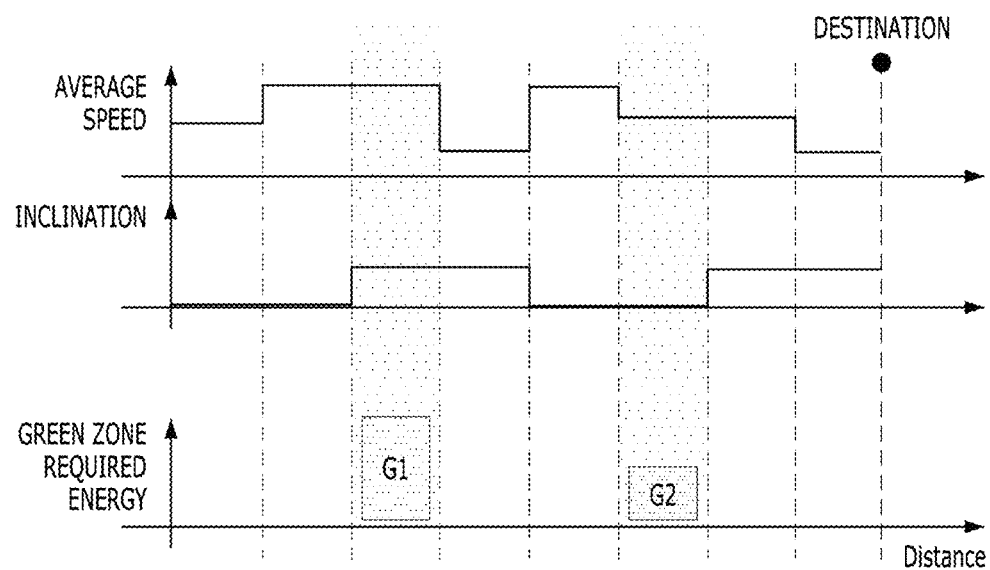
FIG. 7 shows an example of a form for determining the green zone required energy according to one form of the present disclosure.

FIG. 7 shows an example of a form for determining the green zone required energy according to one form of the present disclosure. In FIG. 7, it is assumed that the estimated consumed energy of the corresponding section is obtained by using the average vehicle speed and the inclination. However, the present embodiment is not limited to this, and various factors affecting the estimated consumed energy such as road type, vehicle speed change rate may be considered.

Referring to FIG. 7, it is assumed that there are two green zones on the traveling route from the navigation information to the destination. The green zone required energy for each green zone can be calculated in the form of battery state of charge (SOC) using the average vehicle speed information and the inclination information of each green zone. In more detail, the average battery consumption rate in the corresponding section can be obtained according to the vehicle speed information and the inclination information, and the green zone required energy can be calculated by multiplying the average battery consumption rate by the length of the corresponding section. Here, the average battery consumption rate may be obtained by referring to reference information (for example, a look-up table) prepared in advance for each factor affecting the vehicle speed and the gradient, or may be obtained by using a predetermined reference formula. Also, the length of the corresponding section can be obtained through navigation information.

As described above, the green zone required energy obtained through the process as shown in FIG. 7 can be compared with the total CD mode driving energy. This will be described with reference to FIG. 8.

Figure 8:
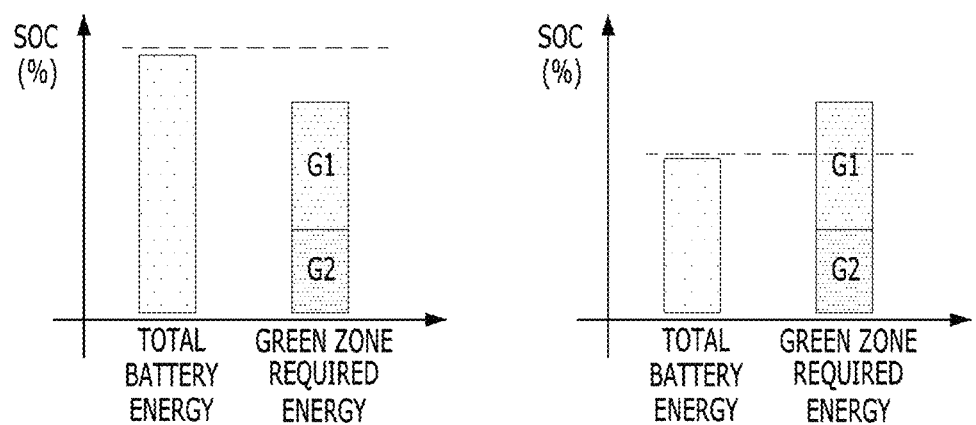
FIG. 8 shows an example of a form in which the green zone required energy and the total CD mode driving energy are compared according to one form of the present disclosure.

FIG. 8 shows an example of a form in which the green zone required energy and the total CD mode driving energy are compared according to one form of the present disclosure. In FIG. 8, the object of the comparison is the sum the green zone required energy for each of at least one green zone existing on the traveling route and the total battery energy.

FIG. 8 shows a case where the total battery energy is larger than the green zone required energy, and the right side shows a case where the total battery energy is smaller than the green zone required energy. For the case on the left side, the entire green zone can be driven only in the CD mode. However, for the case on the right side, unless additional battery charging is performed, the total CD mode driving energy is insufficient for driving the entire green zone in CD mode alone. Hereinafter, the driving strategy according to the result of comparing the total battery energy and the green zone required energy will be described.

First, the driving strategy when the total CD mode driving energy is greater than the green zone required energy is described.

When the total CD mode driving energy is greater than the green zone required energy, CD mode driving is possible in the entire green zone. Therefore, the amount of spare energy obtained by subtracting the green zone required energy from the total CD mode driving energy may be left as a buffering role in the CS mode driving, or at least part of the spare energy may be allocated to the CD mode driving in the remaining section excluding the green zone. The allocation of the spare energy can be performed in the form of changing the reference SOC for mode transition. This will be described with reference to FIG. 9.

FIG. 9 shows an example of setting a mode switching reference is performed based on spare energy according to one form of the present disclosure.

In FIG. 9, two top graphs and one bottom graph are shown. It is assumed that a part of battery SOC 903 is reserved for performing a buffering role for CS mode driving for both the top and bottom graphs. It is also assumed that the amount of SOC corresponding to the reserved SOC 903 is set as a default or absolute reference SOC 930 for mode transition, i.e., mode transition reference. That is, when the battery SOC drops below the default mode transition reference or the absolute mode transition reference 930, the hybrid vehicle transits to the CS mode from the CD mode. Here, the default or absolute mode transition reference 930 is a predetermined value, and may be variable for each vehicle.

Referring first to the top of FIG. 9, when entering the green zone, the vehicle performs the CD mode driving, so the energy available for the CD mode driving 905 (i.e., the total CD mode driving energy) is consumed as the vehicle drives through the green zone. The amount of energy consumed 910 is subtracted from both the green zone required energy 901 and the total CD mode driving energy 905.

On the other hand, when the vehicle travels in an area other than the green zone, the CD/CS mode transition reference 930 can be increased by the remaining green zone required energy 940 as shown in the lower graph of FIG. 9. In this case, even if the CD mode driving is performed before reaching the green zone, the CD mode driving in the green zone can be guaranteed since a mode transition to the CS mode will take place while the green zone required energy 901 is completely maintained. Of course, the SOC 920 excluding the green zone required energy 901 and the buffer 903 for the CS mode driving from the entire SOC can be used for the CD mode driving, and the transition between the CD↔CS modes when using the SOC 920 can be performed using either the SOC based scheme or the driving load based scheme.

Next, the driving strategy when the total CD mode driving energy is smaller than the green zone required energy is described. The driving strategy in this situation is basically like the driving strategy in the case where the total CD mode driving energy is larger than the green zone required energy, but there is a difference in that the charging is performed in a region other than the green zone. In order to perform the charging, the charging section can be set using the traveling route information for the section other than the green zone.

The charging section may be determined by estimating the average driving load of each section by using information such as average vehicle speed, slope, road type, vehicle speed change rate, etc., and setting at least one section having the average driving load suitable for the charging to the charging section according to the system efficiency characteristic. This will be described with reference to FIG. 10.

Figure 10:
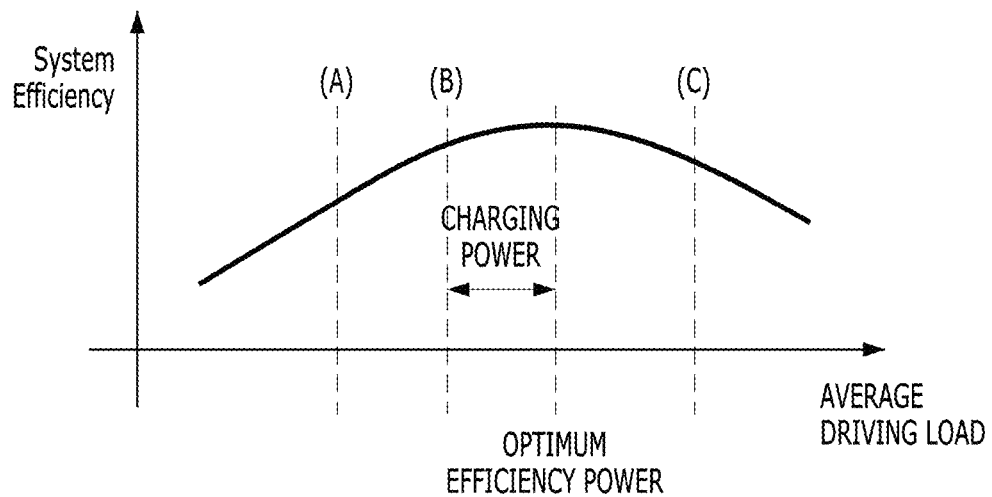
FIG. 10 shows an example of determining a charging interval according to one form of the present disclosure.

FIG. 10 shows an example of determining a charging interval according to one form of the present disclosure.

Referring to FIG. 10, the relationship between average driving load and system efficiency is shown. In FIG. 10, it is assumed that the charging is always performed at an operating point in which the powertrain system outputs the optimum efficiency power with maximum efficiency in the CS mode driving, for example, the maximum efficiency operating point of the engine.

The closer to the optimum efficiency power, the smaller the amount of charge will be, but the path loss gets also smaller. So, the section having the average driving load corresponding to (B) is preferable than the section having the average driving load corresponding to (A) in a view of efficiency. Also, in the section having the average driving load corresponding to (C), charging cannot be performed because the average driving load is larger than the optimum efficiency power. Therefore, when determining the charging section, it is preferable to select with a higher priority a section in which the optimum efficiency power is larger than the average driving load and the difference between the average driving load and the system optimum efficiency power is smaller.

Meanwhile, an estimated charging energy in a section is a product of an estimated charging power and corresponding section, and the estimated charging power can be obtained by subtracting the average driving load at the system optimum efficiency power. Accordingly, the charging sections of the next order can be sequentially selected until the sum of the total CD mode driving energy and the estimated charging energy of the sections becomes equal to or greater than the green zone required energy. An example of a form in which such charging sections are allocated is shown in FIG. 11.

Figure 11:
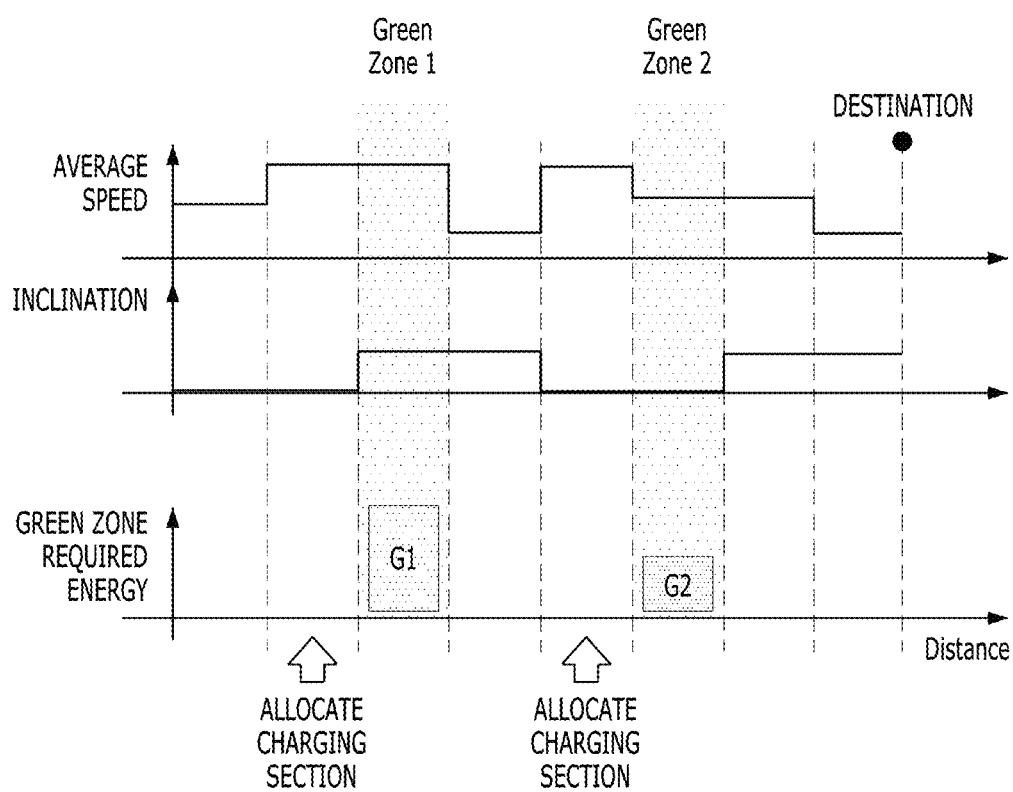
FIG. 11 shows an example of allocating charging sections on a traveling route according to one form of the present disclosure.

FIG. 11 shows an example of allocating charging sections on a traveling route according to one form of the present disclosure.

Referring to FIG. 11, there is shown a case where the charging sections satisfying the condition described above are allocated the right before the green zones, respectively. Only, the location of the allocated charging sections shown in FIG. 11 is an example, and when a plurality of charging sections are selected, the charging sections neither have to be adjacent to each other nor have to be adjacent to the green zone. However, it is preferable to set charging sections so that the SOC corresponding to the sum of the energy required for the corresponding green zone and the buffer SOC for the CS mode driving remains before the entry of arbitrary green zone.

The process of the mode transition control considering the green zone described above is shown as a flowchart in FIG. 12.

Figure 12:
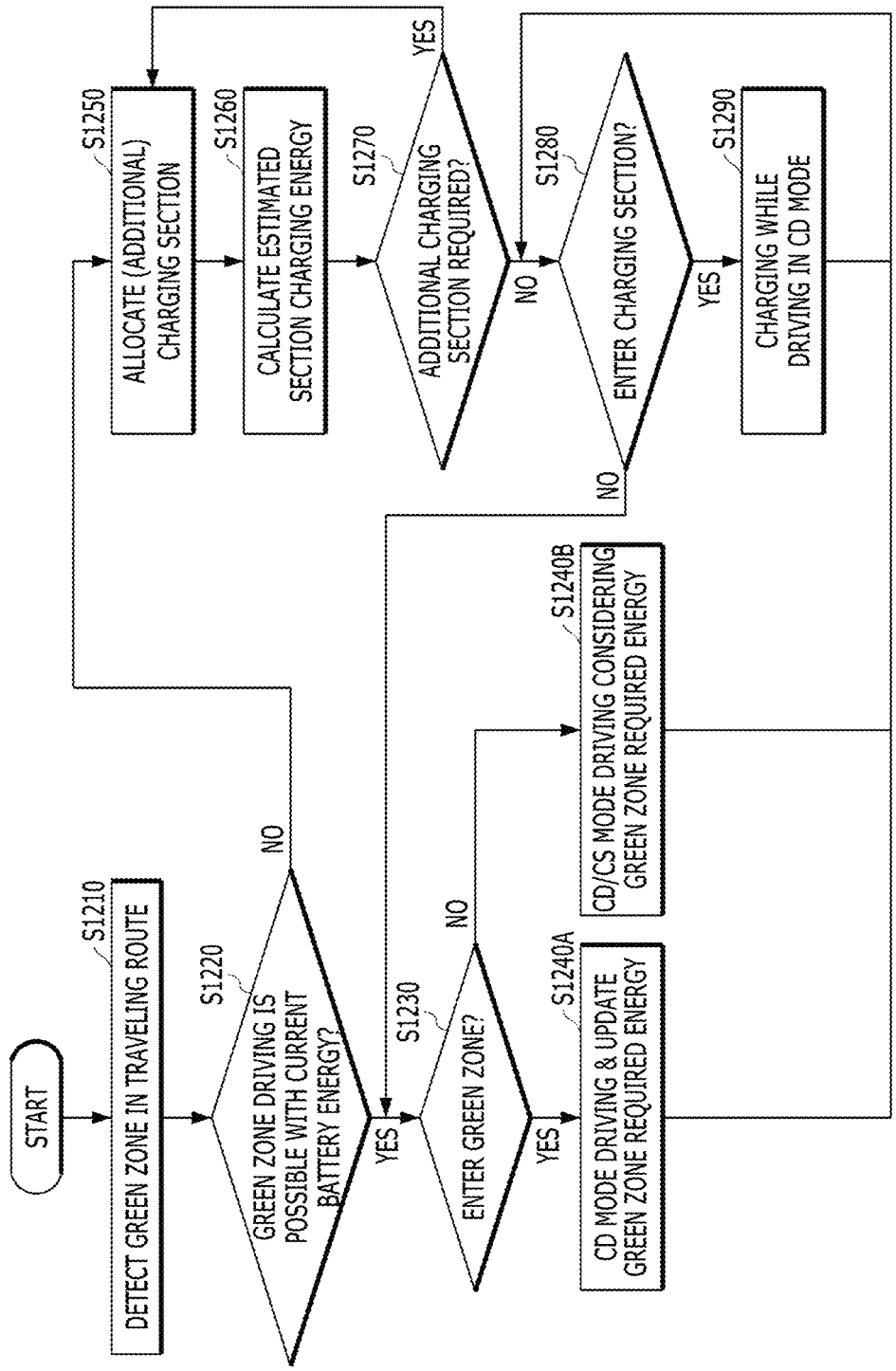
FIG. 12 is a flowchart illustrating an example of a mode transition control process according to one form of the present disclosure.

FIG. 12 is a flowchart illustrating an example of a mode transition control process according to one form of the present disclosure.

Referring to FIG. 12, a green zone on the traveling route can be detected (S1210). Here, the detection of the green zone may mean whether at least one green zone is on the route or not is determined, and when it is determined that there is more than one green zone, the green zone required energy for each green zone is calculated. As described above, the green zone required energy can be obtained by multiplying the average battery consumption rate of the corresponding green zone by the section distance, and the average battery consumption rate is calculated using at least one of average vehicle speed, slope, road type, rate of speed change. Further, information for obtaining the average battery consumption rate can be obtained through navigation information.

Upon detection of the at least one green zone, it is determined whether the CD mode driving for the entire green zone is currently possible, by comparing the total CD mode driving energy and the green zone required energy (S1220).

When it is determined that the CD mode driving for the entire green zone is currently possible according to the comparison result and the vehicle has entered the green zone (S1230), the hybrid vehicle may drive in the green zone in the CD mode (S1240A). At this time, the green zone required energy can be updated in such a manner as to be subtracted by consumed energy through the CD mode driving. Further, the hybrid vehicle can perform the CD mode driving in the green zone regardless of the driving mode before entering the green zone. For example, the hybrid vehicle may transit to the CD mode when the CS mode driving was performed before entering the green zone, or can maintain the CD mode driving while traveling in the green zone when the CD mode driving has been performed before entering the green zone.

When it is determined that the CD mode driving for the entire green zone is currently possible according to the comparison result and current location is other than the green zone, either the CD mode driving or the CS mode driving can be performed by considering the green zone required energy (S1240B). The detailed setting/changing conditions of the mode transition reference are as described above with reference to FIG. 9, and a redundant description will be omitted.

On the other hand, when the green zone required energy is larger than the total CD mode driving energy, the charging section can be allocated (S1250). When the charging section is allocated, the estimated charging energy of the section, which is the energy estimated to be charged in the allocated charging section, can be calculated (S1260). The allocating of the charging section and the additional allocation method are the same as those described above with reference to FIGS. 10 and 11, and a redundant description will be omitted.

If the estimated charging energy is calculated, it may be determined whether the charging section needs to be additionally allocated (S1270). Specifically, if the sum of the estimated charging energy and the total CD mode driving energy is equal to or greater than the green zone required energy, the charging section does not need to be additionally set. Otherwise, one or more charging section may be further allocated (S1250).

When the allocation of charging section is done, it is determined whether the vehicle enters the charging section or not (S1280). When it is determined that the current location corresponds to the charging section, the battery can be charged while performing the CS mode driving (S1290). On the contrary, when it is determined that the current location does not correspond to the charging section, the driving mode can be determined depending on whether the current location corresponds to the green zone or not (S1230).

In the above description, the determination/calculation/control of each step may be carried out by a single controller or a plurality of controllers. For example, the steps of detecting a green zone (S1210), determining whether the vehicle has entered a green zone (S1230), determining whether the vehicle has entered a charging section (S1280), and the like can be performed by an AVN (Audio/Video/Navigation) system, and the result of each step can be transmitted to the hybrid controller. For another example, the AVN system having the GPS module may transmit information required for performing each step (for example, the location, length, slope, road type, green zone entry, the vehicle speed change, the current position, etc.) to the hybrid controller, so the hybrid controller is able to carry out the steps.

The various embodiments disclosed herein, including embodiments of the respective controllers 210-250 described herein, can be implemented using one or more processors coupled to a memory (or other non-transitory machine readable recording medium) storing computer-executable instructions for causing the processor(s) to perform the functions described above including the functions described in relation to the hybrid controller 240, engine controller 210, motor controller 220, clutch controller 230, and transmission controller 250. The processor(s) and memory may be mounted in the hybrid electric vehicle (HEV), and may be communicatively connected to the internal combustion engine 110, motor 120/140, engine clutch 130, and/or transmission 150 as well as to other one(s) of the controllers 210-250 so as to control operation of the vehicle and components thereof as described herein.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The above-described method in accordance with the present disclosure may be implemented as computer readable code stored in a computer readable recording medium. Computer readable recording media include all kinds of computer readable recording devices in which data readable by computers is stored. For example, the computer readable recording media include non-transitory storage media such as a Hard Disk Drive (HDD), a Solid State Drive (SSD), a Silicon Disk Drive (SDD), a ROM, a RAM, a CD-ROM, a magnetic tape, a floppy disk, an optical data storage device, etc. Further, the computer readable recording media may be realized in the form of a carrier wave (for example, transmission over the Internet).

As is apparent from the above description, a hybrid electric vehicle in accordance with at least one embodiment of the present disclosure may perform mode transition control more efficiently.

Particularly, in particular, when a specific region is included in the traveling route, the driving mode is determined so as to maximize the CD mode driving and minimize the engine operation in the specific region.

It will be apparent to those skilled in the art that various modifications and variations can be made in the present disclosure without departing from the spirit or scope of the invention. Thus, it is intended that the present disclosure cover the modifications and variations of this invention provided they come within the scope of the appended claims and their equivalents.

What is claimed is:

1. A method of controlling mode transition for a hybrid vehicle, the method comprising:
    calculating, when at least one specific area associated with exhaust emission is detected on a travel route, a first energy required to travel the at least one specific area in a first driving mode;
    determining whether the hybrid vehicle is capable of traveling at least one specific area in the first driving mode according to a charge state of a battery based on the calculated first energy;
    traveling the at least one specific area in the first driving mode, when it is determined that the hybrid vehicle is capable-of traveling in the first driving mode; and
    determining at least one charging section when it is determined that the hybrid vehicle is incapable of traveling in the first driving mode,
    wherein the first energy is calculated based on at least one of an average vehicle speed, an inclination, a congestion degree, or a road type of each of the at least one specific area, and
    wherein the at least one charging section corresponds to a section in the travel route where charging of the battery is performed in a second driving mode.

2. The method according to claim 1, wherein the step of determining whether the hybrid vehicle is capable of traveling the at least one specific area comprises:
    comparing the first energy with a second energy which is a total energy available for the first driving mode among a currently stored energy in the battery;
    determining that the hybrid vehicle is capable of traveling in the first driving mode when the second energy is equal to or greater than the first energy; and
    determining that the hybrid vehicle is incapable of traveling in the first driving mode when the first energy is greater than the second energy.

3. The method according to claim 2, wherein the second energy is obtained by subtracting a mode transition reference from the currently stored energy, and
    wherein the mode transition reference corresponds to a reference energy for transition from the first driving mode to the second driving mode.

4. The method according to claim 1, wherein the step of traveling comprises traveling in the first driving mode, when the hybrid vehicle enters the at least one specific area, regardless of a previous driving mode before entering the at least one specific area.

5. The method according to claim 1, wherein the step of determining the at least one charging section comprises:
    determining a first charging section in consideration of an average driving load and a system optimum efficiency power in the travel route;
    calculating an estimated charging energy in the first charging section using a distance of the first charging section; and
    determining whether at least one second charging section is required by using a second energy, the estimated charging energy and the first energy.

6. The method according to claim 1, wherein the first driving mode comprises a charge depleting (CD) mode and the second driving mode comprises a charge sustaining (CS) mode.

7. The method according to claim 1, wherein the specific area comprises an area where an exhaust emission reduction is forced or recommended.

8. A computer readable recording medium having recorded thereon a program for executing the method of claim 1.

9. A hybrid vehicle, comprising:
    a first controller configured to, when at least one specific area related to exhaust emission is detected on a travel route, obtain information on the travel route including the at least one specific area; and
    a second controller configured to:
        calculate a first energy required to travel the at least one specific area in a first driving mode based on the information obtained from the first controller,
        determine whether the hybrid vehicle is capable of traveling the at least one specific area in the first driving mode according to a charge state of a battery based on the calculated first energy,
        control driving in the first driving mode to be performed for the at least one specific area, when it is determined that the hybrid vehicle is capable of traveling in the first driving mode, and
        determine at least one charging section when it is determined that the hybrid vehicle is incapable of traveling in the first driving mode,
    wherein the second controller is configured to calculate the first energy based on at least one of an average vehicle speed, an inclination, a congestion degree or a road type of each of the at least one specific area,
    wherein the at least one charging section corresponds to a section in the travel route where charging of the battery is performed in a second driving mode.

10. The hybrid vehicle according to claim 9, wherein the second controller is further configured to:

compare the first energy with a second energy which is a total energy available for the first driving mode among a currently stored energy in the battery, determine that the hybrid vehicle is capable of traveling in the first driving mode when the second energy is equal to or greater than the first energy, and determine that the hybrid vehicle is incapable of traveling in the first driving mode when the first energy is greater than the second energy.

11. The hybrid vehicle according to claim 10, wherein the second controller obtains the second energy by subtracting a mode transition reference from the currently stored energy, and wherein the mode transition reference corresponds to a reference energy for transition from the first driving mode to the second driving mode.

12. The hybrid vehicle according to claim 9, wherein the second controller controls the driving in the first driving mode to be performed when the hybrid vehicle enters the at least one specific area, regardless of a previous driving mode before entering the at least one specific area.

13. The hybrid vehicle according to claim 9, wherein the second controller is further configured to:

determine a first charging section in consideration of an average driving load and a system optimum efficiency power in the travel route, calculate an estimated charging energy in the first charging section using a distance of the first charging section, and determine whether at least one second charging section is required by using a second energy, the estimated charging energy and the first energy.

14. The hybrid vehicle according to claim 9, wherein the first driving mode comprises a charge depleting (CD) mode and the second driving mode comprises a charge sustaining (CS) mode.

15. The hybrid vehicle according to claim 9, wherein the at least one specific area comprises an area where an exhaust emission reduction is forced or recommended.

* * * * *